(12) United States Patent
Weatherspoon

(10) Patent No.: US 6,867,692 B2
(45) Date of Patent: Mar. 15, 2005

(54) AUTOMOBILE MESSAGE DISPLAY DEVICE

(76) Inventor: Tamra Weatherspoon, 9530 3rd Bay St., #7, Norfolk, VA (US) 23518

( * ) Notice: Subject to any disclaimer, the term of this patent is extended or adjusted under 35 U.S.C. 154(b) by 0 days.

(21) Appl. No.: 10/351,869

(22) Filed: Jan. 27, 2003

(65) Prior Publication Data

US 2004/0145463 A1 Jul. 29, 2004

(51) Int. Cl.$^7$ ................................................. G60Q 1/44
(52) U.S. Cl. ........................ 340/479; 340/471; 315/77; 362/541; 362/542
(58) Field of Search ................................ 340/471, 479; 315/77; 362/541, 542

(56) References Cited

U.S. PATENT DOCUMENTS

| | | | | |
|---|---|---|---|---|
| 4,464,649 A | * | 8/1984 | Her ............................ | 340/471 |
| 4,631,516 A | * | 12/1986 | Clinker ....................... | 340/464 |
| 4,928,084 A | * | 5/1990 | Reiser ........................ | 340/479 |
| 5,030,938 A | * | 7/1991 | Bondzeit .................... | 340/431 |
| 5,111,182 A | * | 5/1992 | Ishikawa et al. ............ | 340/479 |
| 5,260,686 A | * | 11/1993 | Kuo ........................... | 340/479 |
| 5,521,466 A | * | 5/1996 | Vincent ....................... | 315/77 |
| 5,825,281 A | * | 10/1998 | McCreary ................. | 340/425.5 |
| 6,300,870 B1 | * | 10/2001 | Nelson ....................... | 340/468 |
| 6,304,174 B1 | * | 10/2001 | Smith et al. ................. | 340/471 |
| 6,553,285 B1 | * | 4/2003 | Bahmad ....................... | 701/1 |
| 2002/0008617 A1 | * | 1/2002 | Lee ............................ | 340/468 |

FOREIGN PATENT DOCUMENTS

CA          2096376        * 11/1994

* cited by examiner

*Primary Examiner*—Daniel Wu
*Assistant Examiner*—Samuel J. Walk
(74) *Attorney, Agent, or Firm*—Bradley D. Goldizen; Goldizen & Associate

(57) ABSTRACT

The invention is a system including a third brake light for an automobile. The brake light is equipped with means for displaying a warning message when an emergency condition arises. Light emitting diodes, thin film transistors, liquid crystal displays, light bulbs or other light emitting or refracting means display a warning message when activated. The light emitting or refracting means operate in a normal mode when an emergency condition is not present.

15 Claims, 5 Drawing Sheets

AUTOMOBILE MESSAGE DISPLAY DEVICE

There are no related applications.
This application was not subject to federal funding.

BACKGROUND OF THE INVENTION

The present invention is generally directed to a light that is typically displayed in the rear or back glass of an automobile. More particularly, the present invention is directed to a third brake light that includes circuitry for alerting motorists behind the vehicle when an emergency condition exists such as a carjacking, automobile breakdown, or automobile theft. A method for alerting other motorists and authorities of the existence of an emergency condition is also disclosed.

Every year thousands of Americans become victims of carjacking. The U.S. Department of Justice released reports on carjacking statistics. Between the years 1987 and 1992, 35,000 annual carjacking incidents occurred in the United States. Between 1992 and 1996, an average of about 49,000 carjacking incidents occurred in the United States annually.

BRIEF SUMMARY OF THE INVENTION

In the preferred embodiments, the present invention is a third brake light that may be added onto automobiles. The brake light includes circuitry that when activated causes a portion of the brake light to display a message such as "call 911." Other traveling motorists seeing the displayed message are alerted to the fact that the driver is in need of assistance or the automobile has been subject to a carjacking incident. Typically, light emitting diodes (LEDs), light bulbs, fiber optics or illumination means of the same specification types are used as the illumination means. However, it is contemplated that various other types of illumination means may be incorporated into a display.

In a first preferred embodiment, the invention includes a first actuation means that corresponds to the state of the brake lights on an automobile. The first actuation means is typically a switch connected to and controlled by the brake pedal. The first actuation means receives electrical energy from a power source such as a battery or alternator/generator circuitry. A second actuation means is a switch that receives electrical energy from a power source. The power source may be a common one that supplies electrical energy to both the first and second actuation means. The second actuation means is typically a switch actuated by an individual in the automobile during an emergency condition. An output from the second actuation means is supplied to the logic circuitry having the output that controls the state either of the first or second illumination means. A third switch or actuation means may be provided distant from the second actuation means and having the same function as the second actuation means.

The logic circuitry includes at least two inputs for receiving outputs from the first and second actuation means or switches. The logic circuitry controls the first illumination means such that when the first actuation means has a "high" output and the second actuation means has a "low" output, the first illumination means assume a "high" or active state.

Thus, in one embodiment the circuit comprises two switches, each having an input and an output, a plurality of lights or LEDs that assume the same state as brake lights on an automobile, a plurality of lights or light emitting diodes that assume a state according to the output of a logic circuit, a power source and any necessary driver and/or decoder circuits. The logic circuit may comprise an exclusive or (XOR) gate.

In the first embodiment, the logic circuitry controls the first illumination means such that when either the first or second actuation means assumes a "high" or active state, the first illumination means emits light. However, the first illumination means assumes a "low" or off state when neither output from the actuation means are high and when both outputs from the actuation means are high. Thus, the first illumination means assumes a state according to an "exclusive-OR" logic function.

In a second preferred embodiment, an output of the first actuation means is supplied to a driver circuit that controls a first illumination means. Likewise, the output of the first actuation means is supplied to driver circuitry having an output that controls the state of a second illumination means. A second input to the driver circuitry receives an output from the second activation means. When an illumination means assumes a "high" or active state, light is produced by the illumination means.

In the second embodiment, a second actuation means receives electrical energy from a power source. The power source may be a common one that supplies electrical energy to both the first and second actuation means. The second actuation means is typically a switch actuated by an individual in the automobile during an emergency condition. An output from the second actuation means is supplied to the logic circuitry having the output that controls the state of the second illumination means.

The logic circuitry includes at least two inputs for receiving outputs from the first and second actuation means or switches. The logic circuitry controls the second illumination means such that when the first actuation means has a "high" output and the second actuation means has a "low" output, the second illumination means assume a "high" or active state.

In the second preferred embodiment, the circuit comprises two switches, each having an input and an output, a first plurality of lights or LEDs that assume the same state as brake lights on an automobile, a second plurality of lights or light emitting diodes that assume a state according to the output of a logic circuit, a power source and any necessary driver and/or decoder circuits. The logic circuit may comprise an exclusive or (XOR) gate or circuitry performing an XOR function.

In additional embodiments, the invention includes a microprocessor and decoder circuitry that controls individual states of LEDs or light bulbs. Likewise, the invention may include a third switch that parallels the operation of the second switch. For example, the second switch may be mounted on the steering column of the automobile to be activated by the driver during an emergency condition. The third switch may be located in the trunk of the automobile such that if the driver is taken at gunpoint and forced into the trunk of the automobile, the driver may actuate the emergency display device while in the trunk to alert others of a dangerous condition.

It is an object of the invention to provide a third brake light that may be used to alert other motorists when an emergency situation arises.

It is another object of the invention to provide a display device that can illuminate an emergency message when a carjacking is occurring or theft has occurred.

It is a further object of the invention to provide a display that will spell out a message on the third brake light even when the brake pedal is or is not depressed.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

DETAILED DESCRIPTION OF THE INVENTION

The following is the preferred embodiment or best mode for carrying out the invention. It should be noted that this invention is not limited by the discussion of the preferred embodiment.

Figure 1:
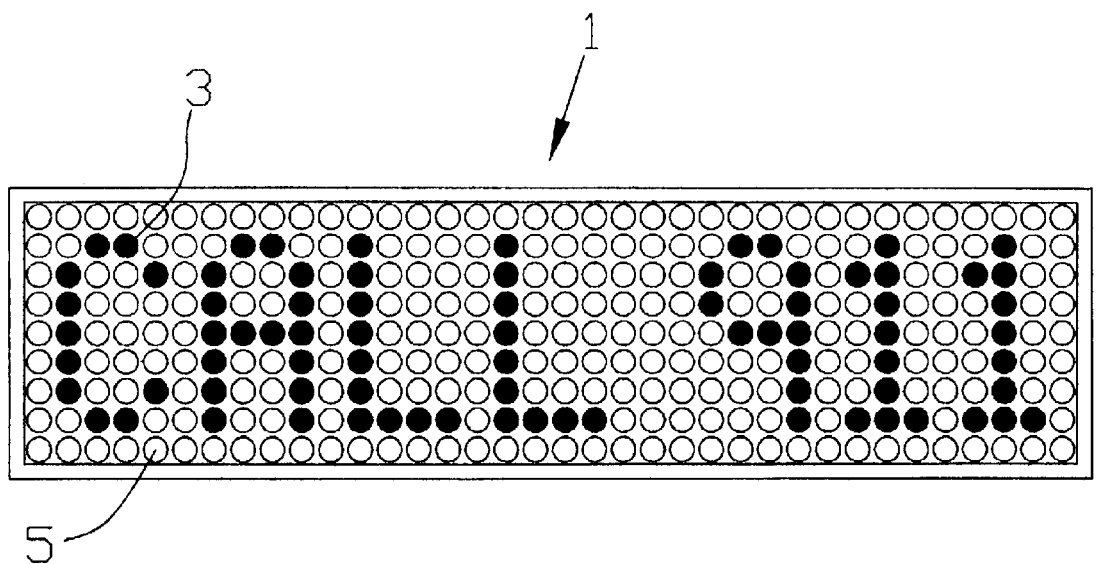
FIG. 1 is a perspective view of the display unit in a second mode of operation.

FIG. 1 depicts an alert message being displayed on the display device of present invention. Display device 1 includes a first plurality of LEDs 5 that operate in accordance with a state of a switch for a brake light on an automobile. Typically, display device 1 functions as a third brake light on an automobile. In FIG. 1, the first plurality of LEDs 5 are shown in the off state. Thus, the brake pedal of the automobile is not depressed.

A second plurality of LEDs 3 are shown as being in the on state wherein they are emitting light. The second plurality of LEDs 3 are lit according to an output from logic circuitry that considers both the state of the switch for the brake light and a state of an emergency switch. Thus, the second plurality of LEDs 3 is controlled in accordance with the state of both the brake light switch and the emergency switch. FIG. 1 depicts the state of the brake light switch as being off; while the state of the emergency switch is a high or on. It should be noted that the output from the logic circuitry and the brake light switch may be interchangeable with respect to the inputs of the first and second plurality of LEDs.

Figure 2:
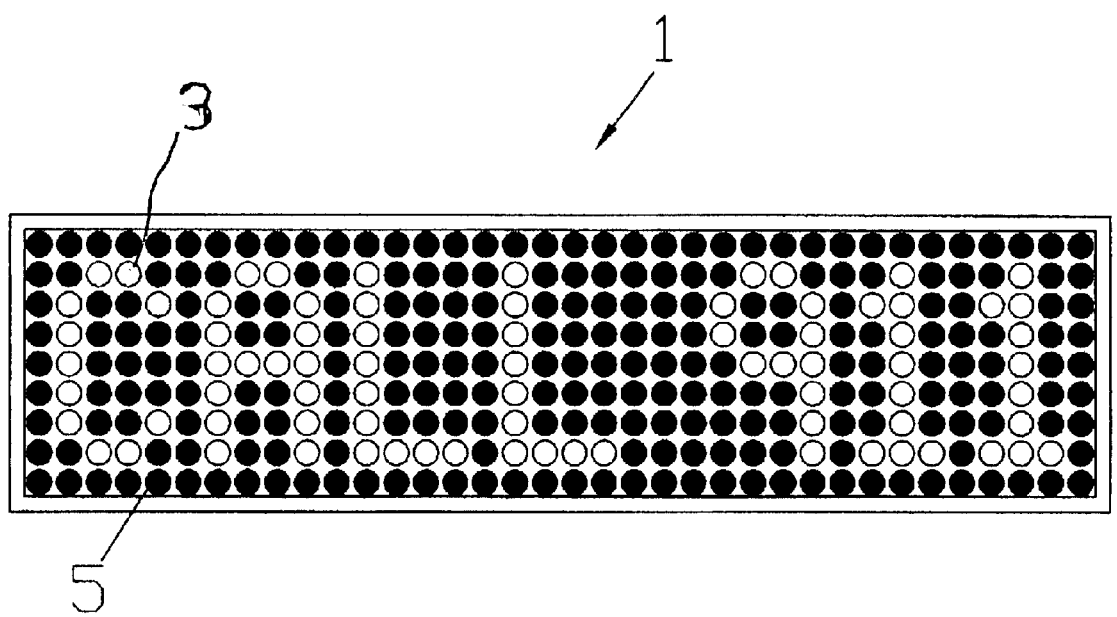
FIG. 2 is a perspective view of the display in a first mode of operation.

FIG. 2 shows the first plurality of LEDs 5 shown in the on state. The second plurality of LEDs 3 is off. This figure represents a condition when the brake pedal is depressed and the emergency switch has been activated. Again it may be noted that the logic circuit may control both the first plurality of LEDs 5 and second plurality of LEDs 3.

Power supply 6 supplies power to an input of a brake switch 9 and an input of an emergency switch 7. Typically, the power supply comprises an automobile battery or a generator/alternator system on an automobile. An output from brake switch 9 is input into driver circuitry 19 that controls a state of the second plurality of LEDs 3. The output from brake switch 9 is also input into a first input of logic circuitry 11.

An output from emergency switch 7 is coupled to a second input of logic circuitry 11. In this embodiment, logic circuitry 11 operates in the manner shown in Table 2 discussed hereinafter. An output from logic circuitry 11 is input into a second driver circuit 13 for controlling the second illumination means.

Figure 3:
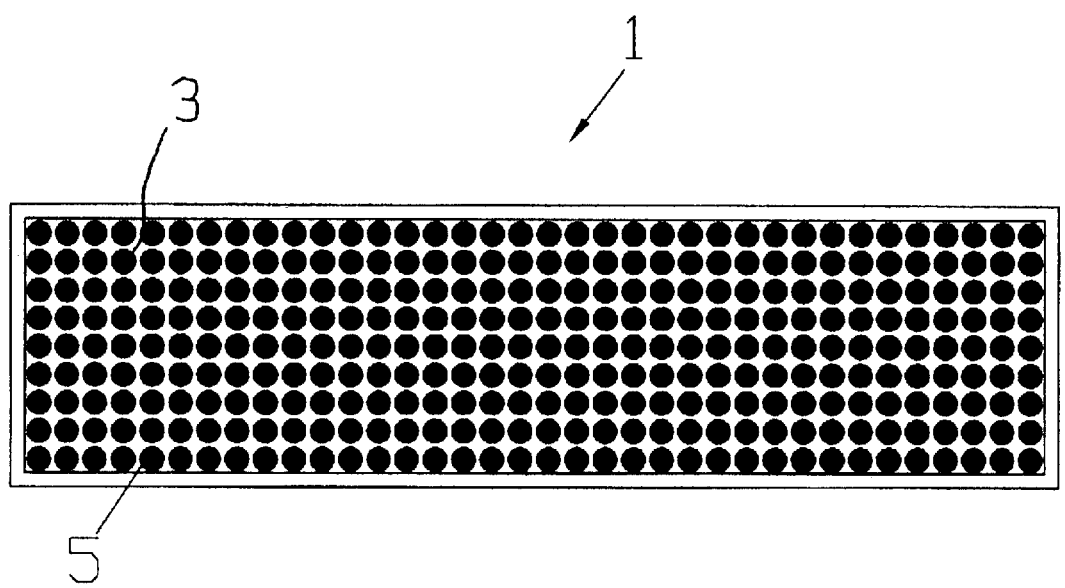
FIG. 3 is a perspective view of the display in a third mode of operation.

FIG. 3 shows the state of the LEDs when only the brake pedal is depressed. In this state both plurality of LEDs 3 and 5 are shown in the on state.

Figure 4:
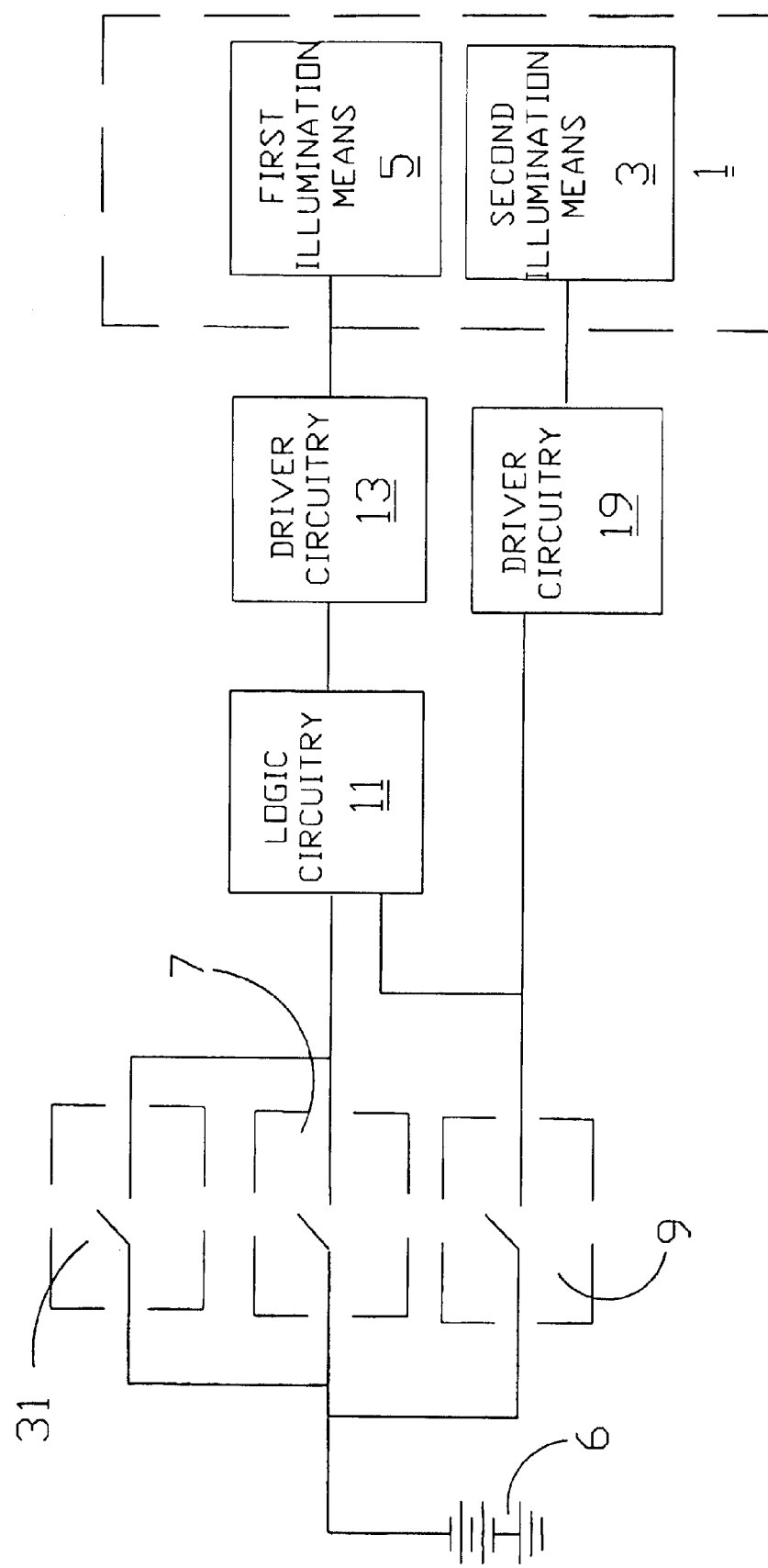
FIG. 4 is a block diagram of the first preferred embodiment of the invention.

FIG. 4 depicts a block diagram of the first preferred embodiment of the invention. Power supply 6 supplies power to an input of a brake switch 9 and an input of an emergency switch 7. Typically, the power supply comprises an automobile battery or a generator/alternator system on an automobile. An output from brake switch 9 is input into driver circuitry 19 that controls a state of the second plurality of LEDs 3. The output from brake switch 9 is also input into a first input of logic circuitry 11.

An output from emergency switch 7 is coupled to a second input of logic circuitry 11. In this embodiment, logic circuitry 11 operates in the manner shown in Table 1 discussed hereinafter. An output from logic circuitry 11 is input into a second driver circuit 13 for controlling the first illumination means 5. It should be noted that a second emergency switch 31 may be paralleled with emergency switch 7 at a location distant from emergency switch 7.

Figure 5:
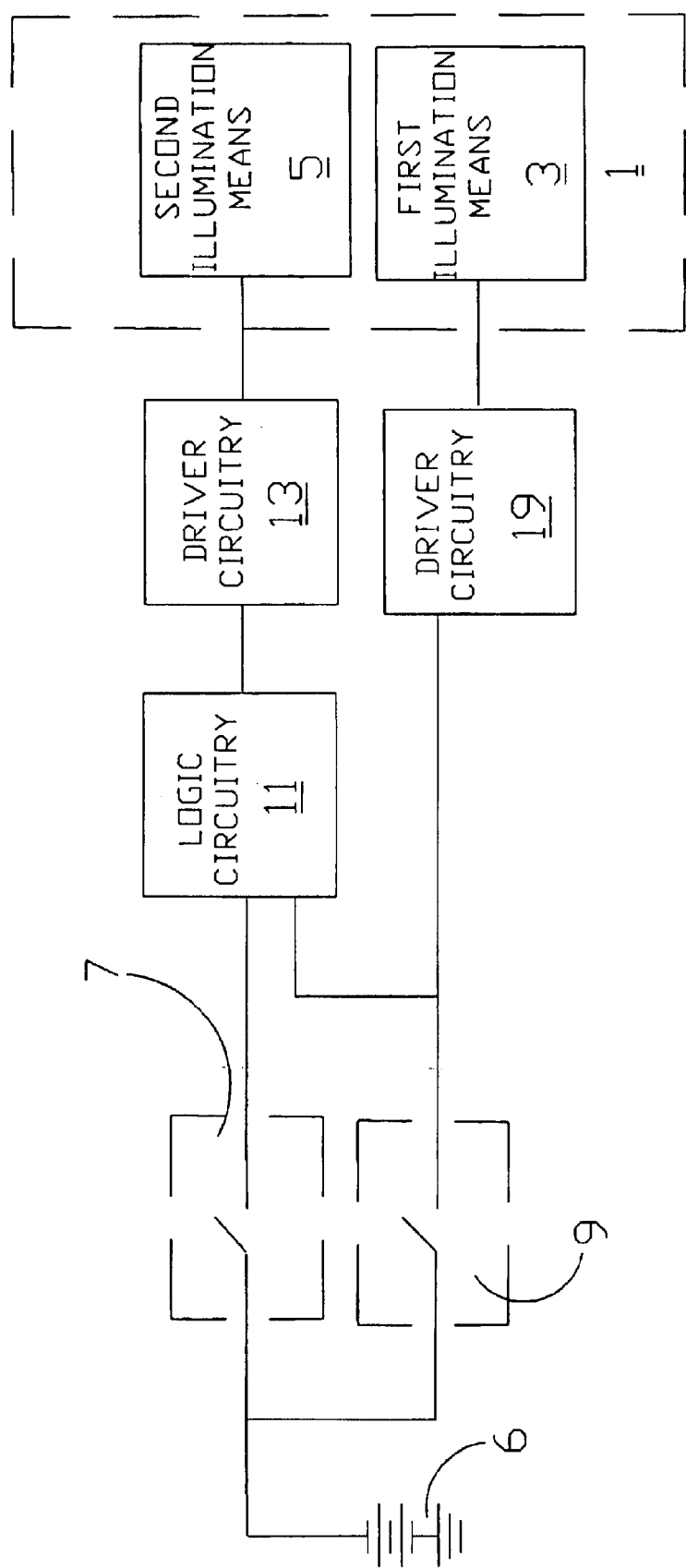
FIG. 5 is a block diagram of the second preferred embodiment of the invention.

FIG. 5 depicts a block diagram of the second preferred embodiment of the invention. Power supply 6 supplies power to an input of a brake switch 9 and an input of an emergency switch 7. Typically, the power supply comprises an automobile battery or a generator/alternator system on an automobile. An output from brake switch 9 is input into driver circuitry 19 that controls a state of the first plurality of LEDs 5. The output from brake switch 9 is also input into a first input of logic circuitry 11.

An output from emergency switch 7 is coupled to a second input of logic circuitry 11. Logic circuitry 11 operates in the manner shown in Table 2 discussed hereinafter. An output from logic circuitry 11 is input into a second driver circuit 13 for controlling the second illumination means 3.

It should be noted that other known circuitry such as latch circuits and decoder circuits may be utilized to control the state of individual LEDs such that an infinite amount of messages may be spelled out on the display device. A microcontroller or processor may also be used to display various messages on the display device.

Table 1 is an operational table showing the state of the illumination means in the first preferred embodiment.

TABLE 1

(according to FIG. 5)

| Brake Light Switch | Emergency Light Switch | 1st Illumination Means | 2nd Illumination Means |
|---|---|---|---|
| 0 | 0 | 0 | 0 |
| 1 | 0 | 1 | 1 |
| 0 | 1 | 0 | 1 |
| 1 | 1 | 1 | 0 |

In Table 1, the second illumination means assumes an off state when the brake light switch and the emergency light switch are both in non-conducting states. The second illumination means is on when either the brake light switch or the emergency light switch are in a conducting or on state. However, the second illumination means is off when both the brake light and the emergency light switch are in conducting states. Thus, the second illumination means always assumes an opposite state of the first illumination means when the emergency light switch is on.

TABLE 2

(according to FIG. 4)

| Brake Light Switch | Emergency Light Switch | 1st Illumination Means | 2nd Illumination Means |
|---|---|---|---|
| 0 | 0 | 0 | 0 |
| 1 | 0 | 1 | 1 |
| 0 | 1 | 1 | 0 |
| 1 | 1 | 0 | 1 |

In Table 2, the first illumination means assumes an off state when the brake light switch and the emergency light switch are both in non-conducting states. The first illumination means is on when either the brake light switch or the emergency light switch are in a conducting or on state. However, the first illumination means is off when both the brake light and the emergency light switches are in conducting states. Thus, the first illumination means always assumes an opposite state of the second illumination means when the emergency light switch is on.

Other embodiments of the invention may be implemented such that when the when the emergency switch is activated a tracking beacon is also activated. Thus, other alarm and recovery methods such as low jack may be used in combination with this invention.

It is to be understood that the invention is not limited to the exact construction illustrated and described above, but that various changes and modifications may be made without departing from the spirit and the scope of the invention as defined in the following claims.

What is claimed is:

1. A display device comprising:
   a first actuation means that corresponds to the state of brake lights on an automobile, said first actuation means having an input for receiving electrical energy and an output for outputting a signal indicative of the state of the brake lights;
   a second actuation means having an input for receiving electrical energy and an output for outputting a signal indicative of an emergency condition;
   logic circuitry having two inputs for receiving outputs from both the first and second actuation means and providing an output;
   a first illumination means coupled to the output of said first actuation means; and,
   a second illumination means coupled to the output of the logic circuitry wherein said second illumination means being off when both the first and second actuation means are in a non-conducting state, said second illumination means being off when both the first and second actuation means are in conducting states and said second illumination means being on when only one of the first and second actuation means is on.

2. The display device of claim 1 wherein said first actuation means comprises a switch.

3. The display device of claim 1 wherein said second actuation means comprises a switch.

4. The display device of claim 1 wherein said first illumination means comprises a plurality of light emitting diodes.

5. The display device of claim 1 wherein said second illumination means comprises a plurality of light emitting diodes.

6. The display device of claim 1 wherein said logic circuitry includes an exclusive-OR gate.

7. The display device of claim 1 further comprising a power source.

8. The display device of claim 1 wherein said first illumination means is selected from a group consisting of lamps, light bulbs or fiber optics.

9. The display device of claim 1 wherein said second illumination means is selected from a group consisting of lamps, light bulbs or fiber optics.

10. The display device of claim 1 further comprising a third actuation means having an input for receiving electrical energy and an output for outputting a signal indicative of an emergency condition, wherein said third actuation means is located remote from said second actuation means.

11. A display device comprising:
    a first switch having an input for receiving electrical energy and an output indicative of a state of brake lights on an automobile;
    a second switch having an input for receiving electrical energy and an output indicative of an emergency condition;
    a logic circuit having two inputs for receiving the outputs of the first and second switches and providing an output;
    a first plurality of lights for receiving the output of the first switch;
    a second plurality of lights for receiving the output of the logic circuit, said second plurality of lights assuming an opposite state of the first plurality of lights when the second switch is activated.

12. The display device of claim 11 wherein said first plurality of lights is selected from a group consisting of light emitting diodes, lamps and fiber optics.

13. The display device of claim 11 wherein said second plurality of lights is selected from a group consisting of light emitting diodes, lamps and fiber optics.

14. The display device of claim 11 wherein said logic circuit includes an exclusive-OR gate.

15. The display device of claim 11 wherein at least one plurality lights spell "call 911" when illuminated.

* * * * *